Figure 1:
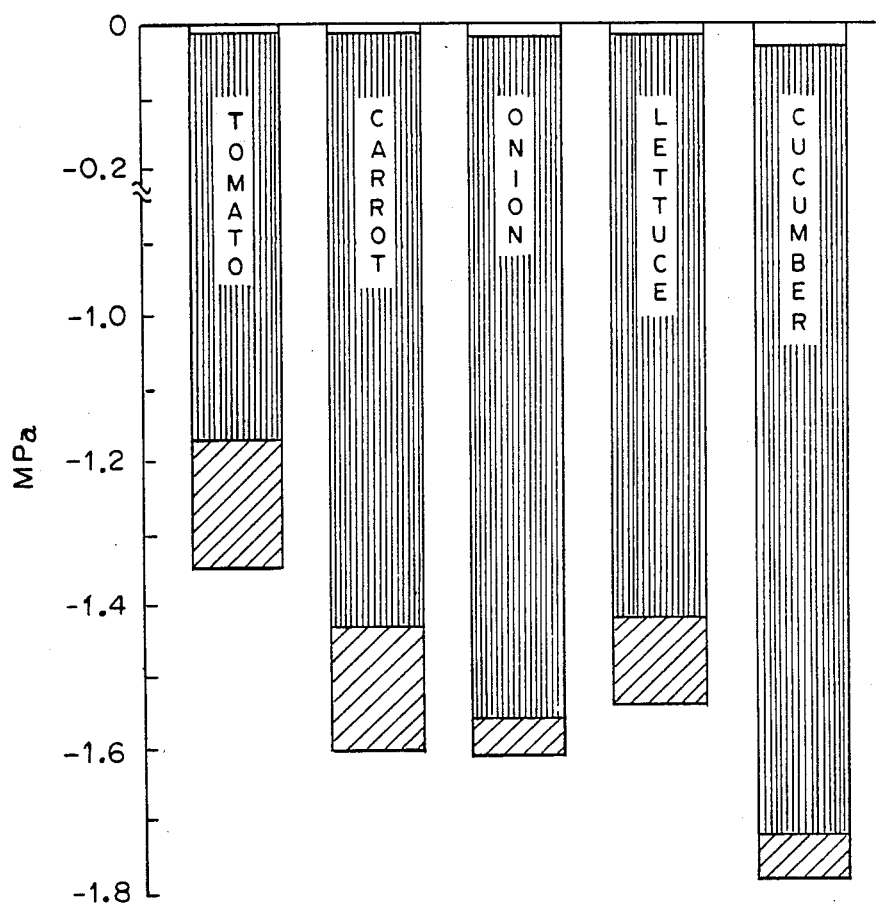

United States Patent [19]

Taylor

[11] Patent Number: 4,912,874
[45] Date of Patent: Apr. 3, 1990

[54] SOLID MATRIX PRIMING OF SEEDS

[76] Inventor: Alan G. Taylor, 532 Nursery Ave., Geneva, N.Y. 14456

[21] Appl. No.: 34,812

[22] Filed: Apr. 3, 1987

[51] Int. Cl.$^4$ .............................................. A01G 7/00
[52] U.S. Cl. ........................................ 47/58; 47/57.6; 47/DIG. 9
[58] Field of Search .............. 47/56, 57.6, 58, DIG. 9; 71/13

[56] References Cited

U.S. PATENT DOCUMENTS

| | | | |
|---|---|---|---|
| 3,900,963 | 8/1975 | Fukus | 47/58 |
| 4,116,666 | 9/1978 | Willard | 47/57.6 |
| 4,624,694 | 11/1986 | Dellicolli | 47/57.6 |
| 4,658,539 | 4/1987 | Sluis | 47/57.6 |
| 4,666,497 | 5/1987 | Tenzer | 71/13 |

FOREIGN PATENT DOCUMENTS 2308229  8/1974  Fed. Rep. of Germany ....... 47/57.6

OTHER PUBLICATIONS

Bennett, M. A. et al. (1984), "Influence of Moisture on Lima Bean Stand Establishment and Growth", *J. Amer. Soc. Hort. Sci.*, 109(5): 623–626.
Bennett, M. A. et al., (1987), "Seed Hydration Treatments for Improved Sweet Corn Germination and Stand Establishment", *J. Amer. Soc. Hort. Sci.*, 112 (1) 45–49.
Beverly, J. D. et al. (1982), "6.9.5 Osmotic Pretreatment-The Priming of Seeds", *Physiology and Biochemistry of Seeds*, Vol. 2, Pub.: Springer-Verlag, Berlin, Heidelburg, New York, 1982, pp. 320–323.
Mexal, J. et al. (1975), "Oxygen Availability in Polyethylene Glycol Solutions and its Implications in Plant-Water Relations", *Plant Physiol.*, vol. 55, pp. 20–24.
Guedes, A. C. et al. (1980), "Germination of Lettuce Seeds at High Temperature after Seed Priming", *J. Amer. Soc. Hort. Sci.*, vol. 105, No. 6, pp. 777–781.
Coolbear, P. et al. (1980), "Osmotic Pre-Sowing Treatments and Nucleic Acid Accumulation in Tomato Seeds", (*Lycopersicon Cycopersicum*), *Seed Sci. & Technol.*, vol. 8, pp. 289–303.
Ells, J. E. (1963), "The Influence of Treating Tomato Seed with Nutrient Solutions on Emergence Rate and Seedling Growth", *Amer. Soc. Hort. Sci.* (Proc.), vol. 83, pp. 684–687.
Szafirowska, Anna, et al. (1981), "Osmoconditioning of Carrot Seeds to Improve Seedling Establishment and Yield in Cold Soil", *Agron J.*, vol. 73, pp. 845–841.
Hegarty, T. W. (1977), "Seed Activation and Seed Germination Under Moisture Stress", *New Phytol.*, vol. 78, pp. 349–359.
Peterson, J. R. (1976), "Osmotic Pruning of Onion Seeds-The Possibility of a Commercial-Scale Treatment", *Scientia Horticultural*, vol. 5, pp. 207–214.

*Primary Examiner*—James R. Feyrer
*Attorney, Agent, or Firm*—Vincent L. Carney

[57] ABSTRACT

In the process of the invention the seed to be treated, a predetermined amount of solid matrix material and a predetermined amount of water are admixed and the mixture allowed to stand, preferably in a container which allows entry of air but which reduces evaporative losses, for example, a closed metal container with a small top opening, for a time and at a temperature sufficient to allow the seeds to imbibe water from the matrix and come to a water content equilibrium sufficient to enhance resultant plant vigor, i.e., enhance emergence, growth or yield characteristics, but short of that which would cause the seed to sprout.

10 Claims, 1 Drawing Sheet

SOLID MATRIX PRIMING OF SEEDS

BACKGROUND OF THE INVENTION

Seed priming or osmoconditioning are terms to describe a pre-sowing hydration treatment developed to improve seedling establishment (Heydecker and Coolbear, 1977, *Seed Science and Technology* 5:353-425), (Khan et al., 1980/81, *Israel J. Bot.* 29:133-144) and (Bradford, 1986, *HortScience* 21:1105-1112). The general procedure is described as follows: Seeds are placed in an aerated osmotic solution of known water potential ($\psi$). Different osmoticums have been used to achieve the solution $\psi$ for priming including high molecular weight (MW of 6000-8000) polyethylene glycol (PEG) and/or inorganic salts (Heydecker and Coolbear, 1977, supra). The osmotic solutions induce a water stress which prevents the completion of germination (radicle emergence). Seeds are, however, able to imbibe and complete the early phases of germination under controlled conditions. The duration of the priming treatment has been reported to be from less than 24 hours (Guedes and Cantliffe, 1980, *J. Amer. Soc. Hort. Sci.* 105:777-781) to several weeks (Khan et al., 1980/81, supra) and is dependant on species, cultivar and even seedlot. Seeds are then removed from the solutions, rinsed and then dried back. After priming, seeds can be sown with existing planters. Results obtained from priming different crop seeds have been reviewed by Bradford, 1986, supra. In general, seedling emergence of primed seeds is earlier and more sychronous than dry sown seeds. Improvements in plant growth and yield characteristics have also been documented.

Several technical and logistical difficulties have been encountered with priming. Osmotic solutions require continuous aeration and in general, a large volume of priming solution is required per quantity of seeds. Reductions in percentage seedling emergence have been reported with the use of inorganic salts (Brocklehurst and Dearman, 1984, *Ann. Applied Biol.* 102:585-593). A relatively high concentration of PEG in solution is viscous and has low oxygen solubility and diffusivity (Mexal et al., 1975, *Plant Physiol.* 55:20-24).

An alternative to the use of solutions is to prime seeds in a solid medium. A solid material should have a high water holding capacity and allow seeds to imbibe. Peterson (1976, *Sci. Hort.* 5:207-214) described a procedure to prime onion seeds in a slurry of PEG 6000 and vermiculite. A ratio of three to four parts vermiculite moistened with PEG solution were mixed with 1 part seed. Although this technique overcame the need for aeration, he reported that the seeds were difficult to separate from the vermiculite. Methods have been described to increase the seed moisture content of large-seeded vegetables prior to sowing (Bennett and Waters, 1984, *J. Amer. Soc. Hort. Sci.* 109: 623-626 and 1987, *J. Amer. Soc. Hort. Sci.*, 112:45-49). Seed moisture content of lima beans (*Phaseolus lunatus*) and sweet corn (*Zea mays*) was increased by combining seed, vermiculite and a known amount of water in a closed container. This mixture was incubated and then the vermiculite sieved away prior to sowing. Seedling establishment was improved by the pre-sowing treatments for both crops.

The present invention describes the use of specific solid phase media to prime small seeded vegetables. The specific solid matrix provided a structure to hold water and allow gas exchange. Water relations of the solid material-seed mixture were characterized and seedling emergence studies were conducted on tomato, carrot and onion. Alleviation of thermodormancy by solid matrix priming was studied in lettuce.

DESCRIPTION OF THE INVENTION

This invention relates to the priming of seeds using a solid phase matrix, rather than using aqueous solutions. The matrix comprises finely divided non plant pathogenic, water holding solid, for example a carbonaceous, preferably a lignateous solid which has a large equilibrium water potential $\psi$ and preferably has an osmotic potential component which is at least and about 90% and preferably greater than 95% of the total water potential. Examples of such materials include coal, especially soft coal, lignateous shales such as the leonardite shale, sold as Agro-Lig, and sphagnum moss.

The matrix material when containing the water necessary to prime the seeds in question must still be sufficiently friable, nonclumping etc. so that, when desired, it can be mechanically separated from the treated seeds after treatment without damage to the seeds. The particle size of the matrix material is not unduly critical, but for mechanical reasons should be smaller than the seed being treated usually less than 20 mesh, but preferably substantialy smaller. Typically a material less than about 60 mesh is preferred; for example the Agro-Lig described hereinafter was 90% /wt less than 200 mesh, the soft coal was less than 60 mesh.

In the process of the invention the seed to be treated, a predetermined amount of solid matrix material and a predetermined amount of water are admixed and the mixture allowed to stand, preferably in a container which allows entry of air but which reduces evaporative losses, for example, a closed metal container with a small top opening, for a time and at a temperature sufficient to allow the seeds to imbibe water from the matrix and come to a water content equilibrium sufficient to enhance resultant plant vigor, i.e., enhance emergence, growth or yield characteristics, but short of that which would cause the seed to sprout.

As in solution priming, the equilibrium amount of water for the system to prime the seed is dependent on the specific seed variety, its state or condition, and the water potential $\psi$ of the medium, here the solid matrix material. Typically the solid matrix material should have a water potential $\psi$ between about $-0.5$ to about $-2.0$ megapascals at equilibrium with the seeds. The seed priming art to some extent is still empirical, and while typical water amounts and media water potentials for a given seed type are already generally known from the solution priming art, it is frequently best to test a small seed sample over a readily determined range of water potentials and temperatures to determine what conditions of temperature, water potential and time cause maximum imbibing of water by the seed, short of sprouting of the seed.

In the preferred process of the invention, a known weight of seed is wet with about 25% by weight of water. The total water utilized is typically in the order of about 1 liter per kilogram of seed but varies with seed size and seed condition. The wetted seed in turn, is mixed with the dry, flowable, particulate solid matrix material, coating the wet seeds with the particulate matrix material. The remainder of the predetermined amount of water for osmoconditioning is then admixed with the coated seeds and the mixture held at a predetermined temperature, usually between about 10° C. and about 25° C. for a time sufficient to allow the seeds to reach a desired moisture content equilibrium, usually one to about fourteen days.

The seeds that can be treated can be virtually any seed, including most vegetable crops, ornamentals and agronomic crops. Included are cucumber, lettuce, carrot, onion, melons, sweet corn, tomatoes, eggplant, peppers, bean, radish, squash, pea, flower seeds, alfafa, and soybean.

The solid matrix priming compositions described above can also advantageously contain prescribed amounts of known seed fungicides such as thiram, captan, metalaxyl, pentachloronitrobenzene, and fenaminosulf, so that the finished primed seed is coated with the desired amount of fungicide, as is known to those skilled in the art.

Likewise, the seeds can be treated with insecticides, pesticides or bactericides prior to or after the solid matrix priming.

EXAMPLE

Seed-Solid Matrix—H₂O

Preliminary studies were conducted to determine the ratio of seed to solid matrix to water for effective solid matrix priming (SMP). The goal was to achieve a seed moisture content that would just prevent radicle emergence for a particular crop. this optimal ratio was determined on an empirical basis by mixing seed and solid matrix on a weight to weight basis. The water was calculated as a percentage of the solid matrix by weight. The seed, solid matrix and water were mixed and incubated at 15° C. in a closed container with a small hole in the lid for ventilation. Results are shown for different crops in Table 1.

TABLE 1

The optimal ratio of seed-solid matrix-water for effective priming of different vegetable at 15° C.

| Crop | Solid Matrix | Parts by weight | | Percentage[z] H₂O | Duration (days) |
|---|---|---|---|---|---|
| | | seed | solid matrix | | |
| Tomato | Agro-Lig[1] | 1.0 | 1.5 | 95 | 6 |
| | Soft coal[2] | 1.0 | 1.5 | 95 | 6 |
| | Sphagnum moss | 1.0 | 1.5 | 90 | 6 |
| Carrot | Agro-Lig | 1.0 | 1.5 | 90 | 6 |
| Onion | Agro-Lig | 1.0 | 2.0 | 80 | 6 |
| Lettuce | Agro-Lig | 1.0 | 2.0 | 85 | 1 |
| Cucumber | Agro-Lig | 1.0 | 1.5 | 60 | 6 |

[z]Percentage water based on dry weight of solid matrix.
[1]total % organic 84%, <1% nitrogen
[2]total % organic 90%, <1% nitrogen Moisture contents and water relations of humates and seeds Seeds of the five crops were primed in Agro-Lig as previously described (Table 1). Seeds were separated from the Agro-Lig by shaking through appropriate sized sieves. At the end of the priming treatment, the percent moisture content of the seeds in Agro-Lig was determined gravimetrically. The matric potential ($\psi$m) of Agro-Lig was determined as described by Black (Ed.), 1965, "Methods of Soil Analysis" Academic Press, NY, NY. The osmotic potential ($\psi$s) of the Agro-Lig was determined by the following procedure. Four parts distilled water was added to one part Agro-Lig (wt/wt), samples from each crop to produce an extract (Greweling and Peech, 1960, N.Y. Agri. Expt. Station Bul. 960). The liquid phase was filtered and the $\psi$s of the Agro-Lig solution extract was determined with a Microsmette model 5004 (Precision Systems Inc., Natick, Ma.). The $\psi$s of Agro-Lig without seeds was also calculated to quantify the influence of seed leakage on the $\psi$s of the medium. The total water potential of the Agro-Lig was determined for each crop after SMP with a HR-33 dewpoint microvolt meter and C-52 sample chamber (Wescor Inc., Logan, UT). Thus the total water potential calculated from its component fractions, $\psi$m and $\psi$s could be compared with the $\psi$ measured by thermocouple psychrometry. There were four replications per treatment for each study.

Seedling emergence studies

The influence of solid matrix priming (SMP) and other conventional seed priming treatments was studied on seedling emergence and plant growth in growth chamber studies. SMP of tomato (*Lycopersicon esculentum*) 'New Yorker' was conducted with Agro-Lig, soft coal and sphagnum moss (Table 1). Other priming treatments included: −1.0 MPa PEG 8000 (Coolbear et al., 1980, *Seed Sci. and Technology* 8:289-303) and 1.0% KNO₃ and 1.5% K₃PO₄ (Ells, 1963, *Proc. Amer. Soc. Hort. Sci.* 83:684-687). SMP of carrot (*Daucus carota*) 'Danvers 126' was conducted with Agro-Lig (Table 1). Other priming treatments included; 25% PEG 8000 (Szafirowska et al., 1981, *Agron. J.* 73:845-848) and 0.2m KNO₃ +0.1m K₃PO₄ (Haigh et al., 1986, *J. Amer. Soc. Hort. Sci.* 111:660-665). SMP of onion (*Allium cepa*) 'Downing Yellow Globe' was performed with Agro-Lig (Table 1). Other priming treatments included; 34.2% PEG 8000 (Brocklehurst and Dearman, 1983, supra) and 0.2m KNO₃ +0.1m K₃PO₄ (Haigh et al., 1986, supra).

All priming treatments were performed at 15° C. for 6 days which, in many cases, is a modification of the original procedure described in the literature. All priming treatments were prepared with 0.2% (wt/v) thiram (Gustafson, Inc. Dallas, TX) as a fungicide.

Seeds were rinsed and blotted dry after priming. Seeds were sown in flats filled with an artificial (peat-vermiculite) soil media. There were four replications of 50 seeds per rep in a randomized complete block design. Flats were maintained in growth chambers with 20° C. day and 10° C. night with a 12 hour photoperiod. Seedling emergence was recorded daily and the plant dry weight was determined at the termination of the emergence period.

Thermodormancy

Alleviation of thermodormancy by priming was studied in lettuce (*Lactuca sativa*) 'Montello'. SMP of lettuce was performed with Agro-Lig (Table 1). Conventional priming treatments included; −1.5 MPa PEG 8000 (Bradford, 1986, supra) and 1.0% K₃PO₄ (Cantliffe et al., 1984, *Plant Physiol.* 75:290-294). After priming, seeds were rinsed and allowed to dry. Seeds were placed to germinate on moistened blotters in closed containers. The containers were maintained at a constant 35° C. in the dark. There were four replications of 50 seeds each and the percent germination was determined after 10 days.

SUMMARY

Seed-Solid Matrix—H₂O

The solid matrix served as a reservoir for water and 1.5 to 2.0 parts of solid matrix were required per part of seed to allow effective priming (Table 1). The percentage of water added varied with crop and ranged from 60 to 95%. Despite the high initial water content of the mixture, the solid matrix remained friable and did not lose its structure.

Moisture contents and water relations

Seeds of all crops were able to imbibe water from the Agro-Lig since a reduction in the Agro-Lig moisture content was measured after SMP (Table 1 and 2). At equilibrium all crops except for cucumber had a percent moisture content that the Agro-Lig (Table 2). The threshold seed moisture content for priming varied with crop and ranged from 42 to 24 percent (wet basis).

TABLE 2

The percent moisture content of Agro-Lig and seeds after SMP. The total water potential of the Agro-Lig was determined by thermocouple pychrometry.

| Crop | Percent moisture content | | | $\psi$ (MPa) |
| --- | --- | --- | --- | --- |
| | Agro-Lig (dry basis) | Seed (dry basis) | Seed (wet basis) | |
| Tomato | 50 | 61 | 38 | −1.1 |
| Carrot | 42 | 67 | 40 | −1.2 |
| Onion | 38 | 73 | 42 | −1.4 |
| Lettuce | 42 | 72 | 42 | −1.4 |
| Cucumber | 35 | 32 | 24 | −1.9 |

The components of the total water potential ($\psi$) responsible for priming were determined. The $\psi$ of Agro-Lig is the sum of the $\psi$s and $\psi$m. The $\psi$ of the medium varied with crop and ranged from −1.34 MPa for SMP tomato to −1.77 MPa for SMP cucumber (FIG. 1). The $\psi$m contributed only a small fraction of the total $\psi$ and ranged from 3 kPa for SMP tomato to 23 kPa for SMP cucumber. The $\psi$s due to the Agro-Lig alone was responsible for the largest portion of the $\psi$, however, additional osmotic effects was attributed to solute leakage from seeds into the medium. Calculation of the Agro-Lig $\psi$ by its component parts (FIG. 1) overestimated (predicted a lower water potential than) the Agro-Lig, except in the case of the cucumber, as determined by thermocouple pychrometry (Table 2).

Seedling emergence studies

Sowing tomato seeds from all priming treatments decreased the time to 50% seedling emergence (T50) and increased the plant dry weight compared to the non-primed control (Table 3). SMP with Agro-Lig and priming with PEG resulted in greater percent emergence, however, the PEG treatment had a higher T50 and less dry weight per plant compared to other priming treatments. From this study and other experiments (data not shown), Agro-Lig was chosen for the solid medium for the remainder of the studies.

TABLE 3

The influence of seed priming treatments on tomato seedling emergence and growth.

| Treatment | Emergence % | T50 (days) | Dry wt. per plant (mg) |
| --- | --- | --- | --- |
| Nontreated | 87 b | 13.0 a | 4.25 c |
| Agro-Lig | 98 a | 9.1 c | 8.36 a |

TABLE 3-continued

The influence of seed priming treatments on tomato seedling emergence and growth.

| Treatment | Emergence % | T50 (days) | Dry wt. per plant (mg) |
| --- | --- | --- | --- |
| Soft coal | 95 ab | 9.6 c | 8.23 a |
| Sphagnum moss | 95 ab | 9.4 c | 8.02 a |
| −1.0 MPa PEG | 98 a | 10.5 b | 7.02 b |
| 1.0% KNO₃ and 1.5% K₃PO4 | 95 ab | 9.1 c | 8.16 a |

LSD (5%)

Priming carrot seeds with inorganic salts result in lower percentage seedling emergence (Table 4). Faster seedling emergence (lower T50) was obtained from sowing SMP seeds with Agro-Lig. Sowing onion seeds after SMP with Agro-Lig decreased the T50 and increased the plant dry weight compared to all other treatments (Table 5).

TABLE 4

The influence of seed priming treatments on carrot seedling emergence and growth.

| Treatment | Emergence (%) | T50 (days) | Dry wt. per plant (mg) |
| --- | --- | --- | --- |
| Nontreated | 88 a | 10.8 a | 1.38 c |
| Agro-Lig | 89 a | 7.7 c | 2.17 a |
| 25% PEG | 87 a | 8.5 b | 1.89 b |
| 0.2 m KNO₃ + 0.1 m K₃PO₄ | 73 b | 8.1 | 2.02 ab |

LSD (5%)

TABLE 5

The influence of seed priming treatments on onion seedling emergence and growth.

| Treatment | Emergence (%) | T50 (days) | Dry wt. per plant (mg) |
| --- | --- | --- | --- |
| Nontreated | 99 a | 11.0 a | 2.16 c |
| Agro-Lig | 98 ab | 6.8 c | 3.61 a |
| 34.2% PEG | 98 ab | 8.2 b | 2.93 b |
| 0.2 m KNO₃ + 0.1 m K₃PO₄ | 95 b | 7.8 b | 2.87 b |

LSD (5%)

Thermodormancy

The beneficial effects of SMP has already been shown by sowing crops into a cool soil environment. Short term priming treatments were also studied to alleviate thermodormancy in lettuce. Imbibing non-primed seeds at 35° C. resulted in 1% germination (Table 6). Conventional priming treatments and SMP with Agro-Lig were able to alleviate thermodormancy.

TABLE 6

The influence of seed priming treatments on lettuce germination at 35° C.

| Treatment | Treatment duration hours | Percent germination |
| --- | --- | --- |
| Nontreated | — | 1 b |
| Agro-Lig | 24 | 75 a |
| −1.5 MPa PEG | 24 | 71 a |
| 1.0% K₃PO₄ | 20 | 71 a |

LSD (5%)

The attainment of a threshold seed water content is most important for seed priming (Table 2). The $\psi$ of the medium is indirectly related to the seed moisture content (r=0.75). Bradford (1986, supra) primed lettuce seeds for 24 hours in −1.5 MPa PEG. The seed moisture content was ca 70% which is in close agreement with our data (Table 2). Similar data has been reported for carrot: seeds were incubated in −1.0 and −1.5 MPa PEG solution for 6 days which resulted in seed moisture contents of 76 and 68% respectively (Hegarty, 1977, *New Phytol.* 78: 349–359).

Results from the water potential components of Agro-Lig are very interesting. One would immediately expect that the major component responsible for $\psi$ was $\psi m$ which is attributed to the fact that Agro-Lig is similar to an organic soil. However, $\psi m$ could account for less than 1.5% of the total (FIG. 1). The major portion of $\psi$ is $\psi s$ which is attributed to the Agro-Lig composition. Analysis of the Agro-Lig has revealed the presence of $10.2 \times 10^3$, $1.84 \times 10^3$ and $1.87 \times 10^3$ ug of calcium, magnesium and sodium, respectively per g of material.

Solute leakage from all seed kinds were found to contribute to the $\psi s$ (FIG. 1). In a separate study, tomato seeds were leached for 6 hours and then dried back to the original moisture content. SMP of these previously soaked seeds resulted in radicle emergence. Thus the osmotic effect of solute leakage from seeds during SMP does contribute to the $\psi$ of the medium.

Determination of the optimal ratio of seed-solid matrix-water was performed on an empirical basis. It must be understood in this system that, unlike priming with solutions, there is not a large portion of solid matrix to seed. Thus as seeds imbibe and leak solutes the $\psi$ of the medium changes. At present, it would appear that a simple screening procedure could be used to obtain the optimal ratio for SMP of a particular seedlot. There are several factors that influence this ratio. Seed characteristics include; threshold seed moisture content, affinity for water and the solute leakage. Agro-Lig characteristics include; innate chemical composition which influence the $\psi s$, the water holding capacity and water retention characteristics.

Seedling emergence and germination tests were conducted to evaluate the promotive effects of the pre-sowing treatments. Conventional priming treatments with PEG in inorganic salts were selected from the literature. Treatment comparisons with liquid priming treatments could better test the effectiveness of SMP. SMP with Agro-Lig was statistically equal to or better than conventional priming treatments for improving seedling emergence, decreasing T50 and increasing plant dry weight (Table 3, 4 and 5). Thermodormancy was shown to be alleviated with either SMP or liquid priming treatments (Table 6).

The question is how can SMP be superior to conventional liquid priming treatments? Several hypotheses are suggested including; better aeration, less phytotoxicity and the availability of growth promoting substances in the Agro-Lig. Humic acid is a naturally occurring plant growth regulator extracted from Agro-Lig (American Colloid Co.). Humic acid has been shown to stimulate seed germination and seedling growth in carrot (Ricotta and Sanders, *J. Am. Soc. Hort. Sci.* in press). Seedling root and shoot growth has been promoted with humic acid in wheat (*Triticum aestivum*) (Malic and Azam, 1985, *Environ. and Exp. Bot.* 25: 245–252).

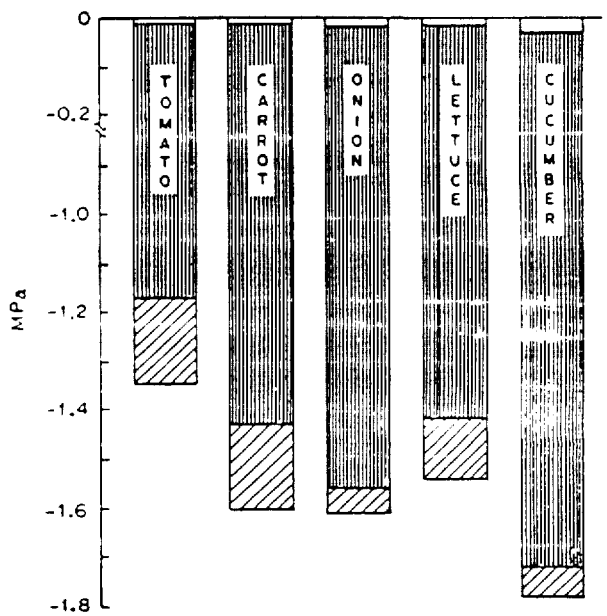

I claim:

1. A method of osmoconditioning seeds which comprises admixing with continuous aeration of seeds, a particulate solid matrix material and a seed osmoconditioning amount of water, for a time and at a temperature sufficient to cause the seeds to imbibe sufficient water to enhance resultant plant vigor but insufficient to cause seed sprouting; in said mixture having a water potential psi between about −0.5 to about −2.0 megapascals at equilibrium with said seeds; said particulate solid matrix material being nonpathogenic to the seeds and being friable when admixed with said seeds and said osmoconditioning amount of water so that said particulate solid matrix material can be mechanically separated from the seeds after the treatment without harm to the seeds.

2. The method of claim 1 where the solid matrix material is a carbonaceous material.

3. The method of claim 2 where the carbonaceous material is a lignateous material.

4. The method of claim 3 in which the lignateous material is a coal.

5. The method as in claim 4 where the seeds are treated with a fungicide prior to osmoconditioning.

6. The method of claim 3 in which the lignateous material is a coal.

7. The method as in claim 6 where the seeds are treated with a fungicide prior to osmoconditioning.

8. The method as in claim 1 where the particulate solid matrix material has a particle size substantially smaller than the seeds so as to facilitate mechanical separation from the seeds based on size.

9. The method as in claim 1 where the seeds are seeds selected from the group consisting of the seed of cucumber, lettuce, carrot, onion, melons, sweet corn, tomatoes, eggplant or peppers.

10. An osmoconditioning composition adapted to osmocondition a selected quantity of seeds which comprises: a particulate solid matrix material which is nonpathogenic to seeds and a seed osmoconditioning amount of water, said mixture having a water potential psi sufficient to cause a desired predetermined seed, when contacted with said composition and when subjected to aeration, to imbibe sufficient water to enhance resultant plant vigor but insufficient to cause seed sprouting with the mixture having a water potential psi between about −0.5 to about −2.0 megapascals at equilibrium with said seeds.

* * * * *

UNITED STATES PATENT AND TRADEMARK OFFICE
CERTIFICATE OF CORRECTION

PATENT NO. : 4,912,874

DATED : April 3, 1990

INVENTOR(S) : John Alvin Eastin

It is certified that error appears in the above-identified patent and that said Letters Patent is hereby corrected as shown below:

The title page should be deleted to appear as per attached title page.

Signed and Sealed this

Third Day of July, 1990

Attest:

Attesting Officer

HARRY F. MANBECK, JR.

Commissioner of Patents and Trademarks

United States Patent [19]

Eastin

[11] Patent Number: 4,912,874
[45] Date of Patent: Apr. 3, 1990

[54] SOLID MATRIX PRIMING OF SEEDS

[76] Inventor: John Alvin Eastin, 1500 West Manor Drive, Lincoln, NE 68506

[21] Appl. No.: 34,812

[22] Filed: Apr. 3, 1987

[51] Int. Cl.⁴ .............................................. A01G 7/00
[52] U.S. Cl. .......................................... 47/58; 47/57.6; 47/DIG. 9
[58] Field of Search .............. 47/56, 57.6, 58, DIG. 9; 71/13

[56] References Cited

U.S. PATENT DOCUMENTS

| | | | |
|---|---|---|---|
| 3,900,963 | 8/1975 | Fukus | 47/58 |
| 4,116,666 | 9/1978 | Willard | 47/57.6 |
| 4,624,694 | 11/1986 | Dellicolli | 47/57.6 |
| 4,658,539 | 4/1987 | Sluis | 47/57.6 |
| 4,666,497 | 5/1987 | Tenzer | 71/13 |

FOREIGN PATENT DOCUMENTS 2308229  8/1974  Fed. Rep. of Germany ....... 47/57.6

OTHER PUBLICATIONS

Bennett, M. A. et al. (1984), "Influence of Moisture on Lima Bean Stand Establishment and Growth", *J. Amer. Soc. Hort. Sci.*, 109(5): 623–626.
Bennett, M. A. et al., (1987), "Seed Hydration Treatments for Improved Sweet Corn Germination and Stand Establishment", *J. Amer. Soc. Hort. Sci.*, 112 (1) 45–49.
Beverly, J. D. et al. (1982), "6.9.5 Osmotic Pretreatment-The Priming of Seeds", *Physiology and Biochemistry of Seeds*, Vol. 2, Pub.: Springer-Verlag, Berlin, Heidelburg, New York, 1982, pp. 320–323.
Mexal, J. et al. (1975), "Oxygen Availability in Polyethylene Glycol Solutions and its Implications in Plant-Water Relations", *Plant Physiol.*, vol. 55, pp. 20–24.
Guedes, A. C. et al. (1980), "Germination of Lettuce Seeds at High Temperature after Seed Priming", *J. Amer. Soc. Hort. Sci.*, vol. 105, No. 6, pp. 777–781.
Coolbear, P. et al. (1980), "Osmotic Pre-Sowing Treatments and Nucleic Acid Accumulation in Tomato Seeds", (*Lycopersicon Cycopersicum*), *Seed Sci. & Technol.*, vol. 8, pp. 289–303.
Ells, J. E. (1963), "The Influence of Treating Tomato Seed with Nutrient Solutions on Emergence Rate and Seedling Growth", *Amer. Soc. Hort. Sci.* (Proc.), vol. 83, pp. 684–687.
Szafirowska, Anna, et al. (1981), "Osmoconditioning of Carrot Seeds to Improve Seedling Establishment and Yield in Cold Soil", *Agron J.*, vol. 73, pp. 845–841.
Hegarty, T. W. (1977), "Seed Activation and Seed Germination Under Moisture Stress", *New Phytol.*, vol. 78, pp. 349–359.
Peterson, J. R. (1976), "Osmotic Pruning of Onion Seeds-The Possibility of a Commercial-Scale Treatment", *Scientia Horticultural*, vol. 5, pp. 207–214.

*Primary Examiner*—James R. Feyrer
*Attorney, Agent, or Firm*—Vincent L. Carney

[57] ABSTRACT

In the process of the invention the seed to be treated, a predetermined amount of solid matrix material and a predetermined amount of water are admixed and the mixture allowed to stand, preferably in a container which allows entry of air but which reduces evaporative losses, for example, a closed metal container with a small top opening, for a time and at a temperature sufficient to allow the seeds to imbibe water from the matrix and come to a water content equilibrium sufficient to enhance resultant plant vigor, i.e., enhance emergence, growth or yield characteristics, but short of that which would cause the seed to sprout.

10 Claims, 1 Drawing Sheet